United States Patent
Han et al.

(10) Patent No.: US 11,305,220 B2
(45) Date of Patent: Apr. 19, 2022

(54) PURIFICATION DEVICE FOR AIR PURIFICATION AND AIR PURIFIER HAVING SAME

(71) Applicants: Guangdong Midea White Home Appliance Technology Innovation Center Co., Ltd., Foshan (CN); Midea Group Co., Ltd., Foshan (CN)

(72) Inventors: Yunqing Han, Foshan (CN); Tongsheng Wang, Foshan (CN); Hui Zhang, Foshan (CN)

(73) Assignees: Guangdong Midea White Home Appliance Technology Innovation Center Co., Ltd., Foshan (CN); Midea Group Co., Ltd., Foshan (CN)

( * ) Notice: Subject to any disclaimer, the term of this patent is extended or adjusted under 35 U.S.C. 154(b) by 0 days.

(21) Appl. No.: 17/160,276

(22) Filed: Jan. 27, 2021

(65) Prior Publication Data

US 2021/0146288 A1 May 20, 2021

Related U.S. Application Data

(63) Continuation of application No. PCT/CN2018/122119, filed on Dec. 19, 2018.

(30) Foreign Application Priority Data

Aug. 31, 2018 (CN) .......................... 201811013328.1

(51) Int. Cl.
  *B01D 47/06* (2006.01)
  *B01D 45/14* (2006.01)
  (Continued)

(52) U.S. Cl.
  CPC .............. *B01D 45/14* (2013.01); *B01D 47/06* (2013.01); *B01D 47/16* (2013.01); *B01D 50/40* (2022.01)

(58) Field of Classification Search
  CPC ........ B01D 47/00; B01D 47/08; B01D 47/16; B01D 45/14; B01D 47/06; B01D 50/004
  See application file for complete search history.

(56) References Cited

U.S. PATENT DOCUMENTS 8,313,569 B2    11/2012   Park et al.
2011/0155117 A1  6/2011   Kim et al.
(Continued)

FOREIGN PATENT DOCUMENTS

CN    101072618 A    11/2007
CN    201108754 Y     9/2008
(Continued)

OTHER PUBLICATIONS

Guangdong Midea White Household Appliances Technology Innovation Center Co., Ltd., The Third Office Action, CN Application No. 201811013328.1, dated Jun. 18, 2021, 18 pgs.
(Continued)

*Primary Examiner* — Robert A Hopkins
(74) *Attorney, Agent, or Firm* — Morgan, Lewis & Bockius LLP

(57) ABSTRACT

A purification device comprising a housing provided with an air inlet and an air outlet and at least one purifying assembly rotatably arranged in a cavity inside the housing. A respective purifying assembly comprises a first rotary cylinder and a first rotary disk. The first rotary disk is connected downstream of the first rotary cylinder, and a portion of the first rotary disk is provided with a second mesh. The purification device further comprises a water inlet pipe including a water inflow end and a water discharge end that is provided with a plurality of circumferentially distributed water injection nozzles. The purification device further comprises a fan assembly including a fan and a motor. The fan is arranged downstream of the purifying assembly to drive air from the
(Continued)

air inlet to the air outlet, and the motor is configured to drive the purifying assembly and the fan into rotation.

20 Claims, 5 Drawing Sheets

(51) Int. Cl.
    *B01D 47/16*      (2006.01)
    *B01D 50/40*      (2022.01)

(56) References Cited

U.S. PATENT DOCUMENTS

| | | |
|---|---|---|
| 2016/0010881 A1 | 1/2016 | Moon et al. |
| 2017/0122587 A1 | 5/2017 | Son et al. |

FOREIGN PATENT DOCUMENTS

| | | | |
|---|---|---|---|
| CN | 201132076 Y | 10/2008 | |
| CN | 104436939 A | 3/2015 | |
| CN | 204219955 U | 3/2015 | |
| CN | 104606965 A | 5/2015 | |
| CN | 105817099 A | 8/2016 | |
| CN | 205730716 U | 11/2016 | |
| CN | 106512565 A | 3/2017 | |
| CN | 206121405 U | 4/2017 | |
| CN | 107648961 A | 2/2018 | |
| CN | 207661867 U | 7/2018 | |
| CN | 108434904 A | 8/2018 | |
| JP | 2009066389 A * | 4/2009 | |
| WO | WO-2007094727 A1 * | 8/2007 | ............ B01D 45/14 |
| WO | WO 2013141549 A1 | 9/2013 | |

OTHER PUBLICATIONS

Guangdong Midea White Home Appliance Technology Innovation Center Co., Ltd., International Search Report and Written Opinion, Application No. PCT/CN2018/122119, dated May 24, 2019, 7 pgs.

Guangdong Midea White Home Appliance Technology Innovation Center Co., Ltd., Notice of Rejection, CN Application No. 201811013328.1, dated Sep. 22, 2021, 11 pgs.

Guangdong Midea White Home Appliance Technology Innovation Center Co., Ltd., Extended European Search Report, EP Application No. 18931891.8, dated Sep. 24, 2021, 7 pgs.

Guangdong Midea White Home Appliance Technology Innovation Center Co. Ltd., Second Office Action, CN201811013328.1, dated Mar. 12, 2021, 11 pgs.

International Search Report and Written Opinion, PCT/CN2018/122119, dated May 24, 2019, 9 pgs.

Guangdong Midea White Home Applicance Technology Innovation Center Co. Ltd., First Office Action, CN201811013328,1, dated Jul. 22, 2020, 15 pgs.

* cited by examiner

PURIFICATION DEVICE FOR AIR PURIFICATION AND AIR PURIFIER HAVING SAME

CROSS-REFERENCE TO RELATED APPLICATION

This application is a continuation of PCT International Application No. PCT/CN2018/122119, filed Dec. 19, 2018, which is based upon and claims priority to Chinese Patent Application No. 201811013328.1, filed on Aug. 31, 2018, each of which is hereby incorporated by reference in its entirety.

TECHNICAL FIELD

The disclosure relates to the field of domestic appliances, and in particular to a purification device for purifying air and an air purifier provided with same.

BACKGROUND

An air purifier is configured to purify air to improve the air quality. Most air purifiers in the related art use purification devices to directly purify air. For example, a purification net or an adsorption device can purify and adsorb dust in the air, but it is complicated in structure and poor in purification effect.

SUMMARY

The disclosure aims to at least solve the technical problems in the related art. For this purpose, an objective of the disclosure is to provide a purification device for purifying air. The purification device is simple in structure, good in purification effect and low in pressure loss.

The disclosure further provides an air purifier provided with the purification device for purifying air.

According to a first aspect of the disclosure, a purification device for purifying air includes: a housing provided with an air inlet and an air outlet, a cavity communicating with the air inlet and the air outlet being defined in the housing; at least one purifying assembly rotatably arranged in the cavity and located between the air inlet and the air outlet, the purifying assembly including a first rotary cylinder and a first rotary disk, the first rotary cylinder being spaced apart from a side wall of the housing, a side wall of the first rotary cylinder being provided with a first mesh in a circumferential direction of the side wall of the first rotary cylinder, the first rotary disk being connected downstream of the first rotary cylinder, and a portion of the first rotary disk, which is located between the first rotary cylinder and the housing in a radial direction, being provided with a second mesh; a water inlet pipe including a water inflow end and a water discharge end, the water discharge end being provided with a plurality of circumferentially distributed water injection nozzles, and the water discharge end extending into the first rotary cylinder; a fan assembly, the fan assembly including a fan and a motor, the fan being arranged downstream of the purifying assembly to drive air to flow from the air inlet to the air outlet via the purifying assembly, and the motor being configured to drive the purifying assembly and the fan into rotation.

The purification device for purifying air according to the embodiments of the disclosure can realize efficient purification for the air, is good in purification effect, and is simple in structure and low in pressure loss.

In addition, the purification device for purifying air according to the embodiments of the disclosure can further have the following additional technical features.

In some embodiments of the disclosure, the motor is arranged above the fan and is connected with the fan to drive the purifying assembly and the fan to rotate synchronously.

In some embodiments of the disclosure, the fan is arranged above the first rotary disk and is fixedly connected with the first rotary disk.

In some embodiments of the disclosure, the motor has a motor shaft, and each of the purifying assembly and the fan is connected with the motor shaft.

In some embodiments of the disclosure, the fan includes a body and a plurality of fan blades. The plurality of fan blades are distributed along a circumferential direction of the body and spaced apart from each other.

In some embodiments of the disclosure, the fan blades are arranged on a side wall of the body, and are located above a portion of the first rotary disk which is located between the housing and the body.

In some embodiments of the disclosure, the body is cylindrical. The body is coaxial with the first rotary disk and the first rotary cylinder. A dimension of the body in the radial direction is the same as a dimension of the first rotary cylinder in the radial direction.

In some embodiments of the disclosure, each of an upper end and a lower end of the first rotary cylinder is formed as a closed structure, and a bottom wall of the first rotary cylinder is provided with an opening adapted to be passed by the water inlet pipe.

In some embodiments of the disclosure, the air outlet is arranged at a position higher than the air inlet. The purification device for purifying air includes a plurality of purifying assemblies which are sequentially stacked in an up and down direction.

According to some embodiments of the disclosure, the purification device for purifying air further includes a capture member. The capture member is rotatably arranged between the purifying assembly and the fan assembly. The capture member includes a second rotary cylinder and a second rotary disk. An outer circumferential wall of the second rotary cylinder is a cylindrical surface. The second rotary cylinder is spaced apart from the side wall of the housing. The second rotary disk is connected downstream of the second rotary cylinder. A portion of the second rotary disk, which is located between the second rotary cylinder and the housing at least in the radial direction, is provided with a third mesh.

The disclosure further provides an air purifier provided with the purification device for purifying air according to the above embodiments.

The air purifier according to the embodiments of the second aspect of the disclosure can enhance the purification effect by means of the arrangement of the purification device for purifying air according to the above embodiments, and is simple in structure and low in pressure loss.

Additional aspects and advantages of the disclosure will be provided in the following description, and will become apparent from the following description or be learned through the practice of the disclosure.

BRIEF DESCRIPTION OF THE DRAWINGS

The above and/or additional aspects and advantages of the disclosure will become apparent and easily understandable from the following description of the embodiments with reference to the accompanying drawings.

LIST OF REFERENCE NUMERALS

Figure 1:
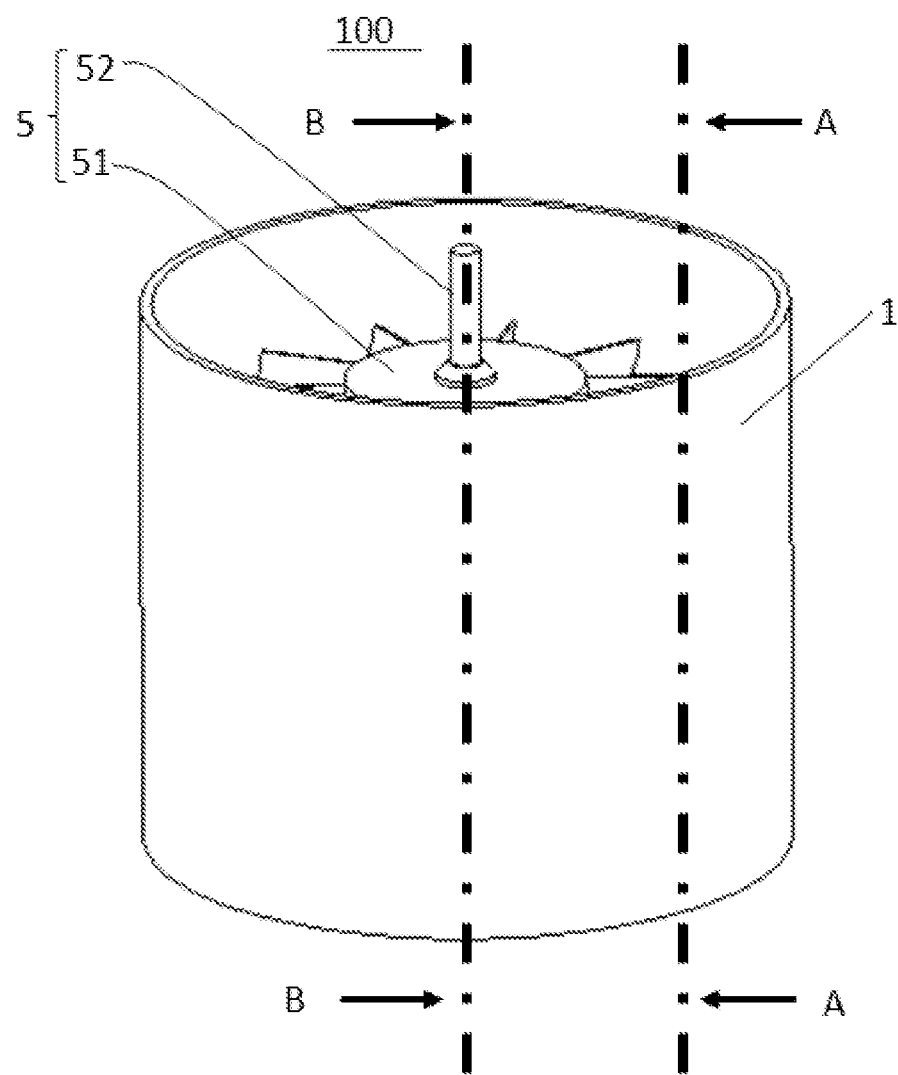
FIG. 1 illustrates a schematic diagram of a purification device for purifying air according to the embodiments of the disclosure.

100: purification device for purifying air;
1: housing; 10: cavity; 11: air inlet; 12: air outlet;
2: first rotary cylinder; 21: first mesh; 22: opening; 23: first interval space;
3: first rotary disk; 31: second mesh;
4: water inlet pipe; 41: water inflow end; 42: water discharge end;
5: fan assembly; 51: fan; 511: body; 512: fan blade; 52: motor.

DETAILED DESCRIPTION

Embodiments of the disclosure are described in detail below, examples of which are illustrated in the accompanying drawings. The same or similar reference numerals represent the same or similar elements or elements having the same or similar functions throughout. The embodiments described below with reference to the drawings are exemplary, and are intended to explain the disclosure only, and should not be construed as limiting the disclosure.

A purification device for purifying air 100 according to the embodiments of the disclosure is described below with reference to FIG. 1 to FIG. 5.

As shown in FIG. 1 to FIG. 5, the purification device for purifying air 100 according to the embodiments of the disclosure includes a housing 1, a purifying assembly, a water inlet pipe 4, and a fan assembly 5. The housing 1 is provided with an air inlet 11 and an air outlet 12. A cavity 10 communicating with the air inlet 11 and the air outlet 12 is defined in the housing 1. In this way, air can enter the housing 1 from the air inlet 11, then is purified via the cavity 10, and is discharged from the air outlet 12.

Figure 3:
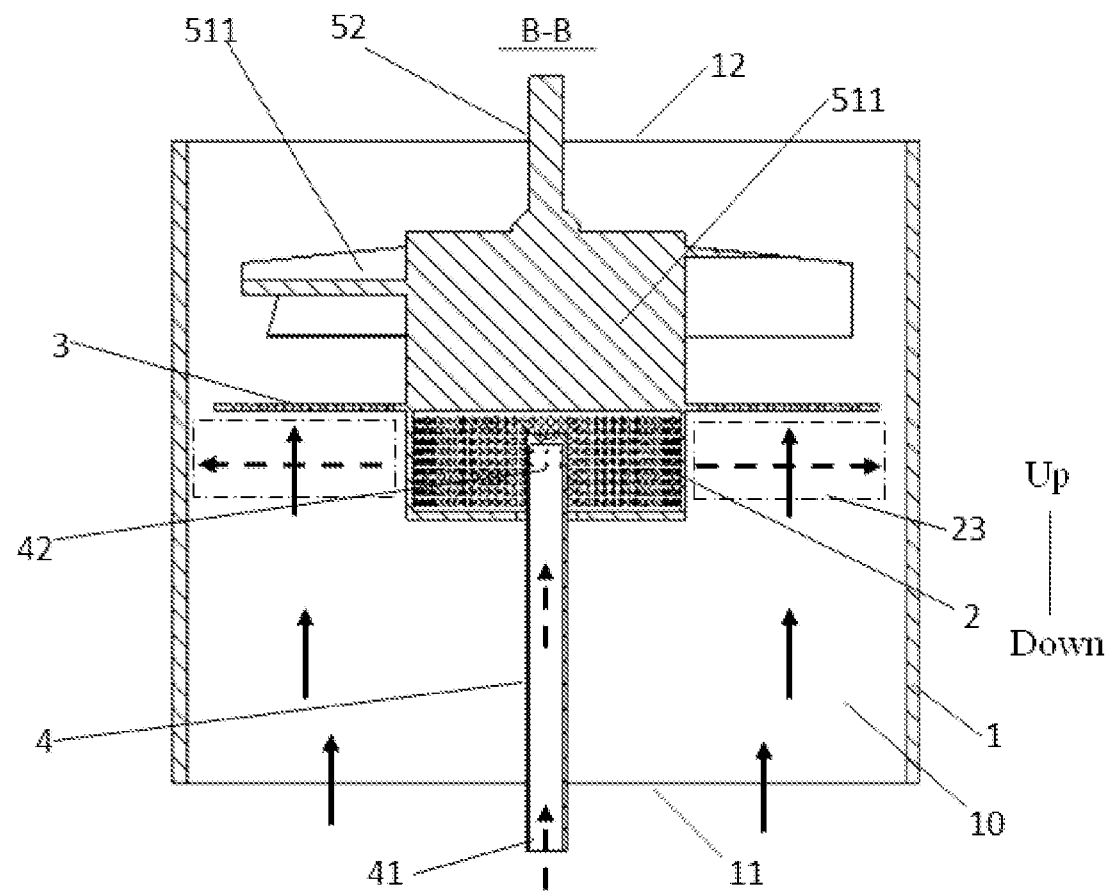
FIG. 3 is a sectional view of FIG. 1 along B-B.

Specifically, the purifying assembly is rotatably arranged in the cavity 10, and is located between the air inlet 11 and the air outlet 12. The purifying assembly includes a first rotary cylinder 2 and a first rotary disk 3. The first rotary cylinder 2 is spaced apart from a side wall of the housing 1. In other words, the first rotary cylinder 2 is rotatable at a high speed in the cavity 10. The first rotary cylinder 2 is spaced apart from an inner wall surface of the cavity 10 to form a first interval space 23 adapted to be passed by air, and the first rotary cylinder 2 is located between the air inlet 11 and the air outlet 12. In this way, air entering from the air inlet 11 may pass through the first interval space 23. That is, the air may pass through the air inlet 11, the first interval space 23 and the air outlet 12 in sequence in a flowing direction (such as a direction pointed by the arrow as shown in FIG. 3) of the air.

A side wall of the first rotary cylinder 2 is provided with a first mesh in a circumferential direction of the side wall of the first rotary cylinder 2. The first rotary disk 3 is connected downstream of the first rotary cylinder 2. As shown in FIG. 2 to FIG. 5, the first rotary disk 3 is rotatably arranged above the first rotary cylinder 2. A portion of the first rotary disk 3, which is located between the first rotary cylinder 2 and the housing 1 in a radial direction, is provided with a second mesh 31. That is, an outer diameter of the first rotary disk 3 is greater than an outer diameter of the first rotary cylinder 2. A portion of the first rotary disk 3, which corresponds to the first interval space 23 in an axial direction of the first rotary disk 3, is provided with a plurality of second meshes 31. The air can pass through the second meshes to flow downstream.

It should be noted that in the flowing direction of the air, a position where the air passes at first is upstream, and a position where the air passes later is downstream. The upstream and the downstream are only used for indicating position relationships. The downstream is a position on a structure where the air passes later. For example, the first rotary disk 3 is connected downstream of the first rotary cylinder 2. That is, in the flowing direction of the air, the first rotary disk 3 is arranged on a side of the first rotary cylinder 2 where the air flows later. For example, as shown in FIG. 2 to FIG. 5, the first rotary disk 3 is arranged on an upper side of the first rotary cylinder 2.

The water inlet pipe 4 includes a water inflow end 41 and a water discharge end 42. The water discharge end 42 is provided with a plurality of circumferentially distributed water injection nozzles. The water discharge end 42 extends into the first rotary cylinder 2. The water inlet pipe 4 is stationary, and the first rotary cylinder 2 rotates at a high speed relative to the water inlet pipe 4, thereby facilitating water delivery. Of course, the disclosure is not limited to this. The water inlet pipe 4 may also rotate around its axis.

Specifically, the water inflow end 41 of the water inlet pipe 4 communicates with a water source. Water can be injected from the water inlet pipe 4 into the first rotary cylinder 2 by means of the plurality of circumferentially distributed water injection nozzles of the water discharge end 42. The first rotary cylinder 2 rotates at a high speed, so that the water injected into the first rotary cylinder 2 is spread into a liquid film on an inner wall of the first rotary cylinder 2. The liquid film passes through the first mesh 21 under the action of a centrifugal force, and then is torn to be a form of fine water column, water drop or water mist under the action of a shear force. By means of tearing the water to be the form of fine water column, water drop or water mist, a contact area between the water and the air can be enlarged, and full mixing of the water and the air is facilitated, thereby facilitating purification of contamination particles such as dust in the air through the water.

For the convenience of description, the following description mainly takes the water droplets in the fine water column, water droplet or water mist as an example. However, this should not be understood as a limitation of the disclosure.

The water drops enter the first interval space 23, and may be mixed with air flowing through the first interval space 23. Therefore, a part of the water drops can capture the dust particles in the air and do centrifugal motion with the dust particles, and can be thrown to an inner wall surface of the housing 1 to fall off along the inner wall surface. A part of the water drops will continue to flow downstream. The first rotary disk 3 is arranged downstream of the first interval space 23. When the air flows through the first rotary disk 3, residual water in the air contacts the first rotary disk 3. Since the first rotary disk 3 rotates at a high speed, the water drops can be spread into a thin liquid film on the first rotary disk 3 provided with the plurality of second meshes 31 or can be atomized into smaller water drops under the action of the centrifugal force, and collide strongly with the air passing through the second meshes 31, thereby further enlarging the air-liquid contact area. At the same time, the spread thin liquid film or the smaller water drops also have a more efficient capturing effect on the dust particles contained in the air, thus achieving improved dust removal. Furthermore, when the air passes through the first rotary disk 3, the rotation of the first rotary disk 3 can also drive the air to flow to provide power to the air that passes through the first rotary disk 3, so that purified air flows towards the air outlet 12.

The fan assembly 5 includes a fan 51 and a motor 52. The fan 51 is arranged downstream of the purifying assembly to drive the air to flow from the air inlet 11 to the air outlet 12 via the purifying assembly. The motor 52 is configured to drive the purifying assembly and the fan 51 into rotation. Therefore, by arranging the fan 51 downstream of the purifying assembly, the fan 51 rotates at a high speed under the driving of the motor 52, to drive the air to enter the cavity 10 of the housing 1 from the air inlet 11 and flow towards the air outlet 12. For example, the fan 51 may drive the air to flow along a direction corresponding to arrows as shown in FIG. 3, to drive the air to flow and to avoid pressure loss. Furthermore, the fan 51 and the purifying assembly are driven by the same motor 52, so that the structure is simple, the occupation is small and the energy consumption is low.

Therefore, according to the purification device 100 for air purification of the embodiments of the disclosure, the first rotary cylinder 2 rotates at the high speed, so that the water injected from the water inlet pipe 4 into the first rotary cylinder 2 can be torn into the form of fine water column, water drop or water mist via the first mesh 21, and flow to the first interval space 23. At the same time, the air entering the air inlet 11 flows through the first interval space 23. Therefore, the water drops in the first interval space 23 is mixed with the air flowing through the first interval space. The water drops can efficiently capture the dust particles in the air flowing through the first interval space 23, thus removing the dust particles and the like from the air to achieve a purification effect on the air.

The fan assembly 5 is arranged downstream of the purifying assembly. Therefore, the fan assembly 5 can drive the air to flow to avoid the pressure loss. Furthermore, the fan 51 and the purifying assembly are driven together by the same motor 52, so that the purification device 100 is simple in structure, small in occupation and low in energy consumption.

Figure 2:
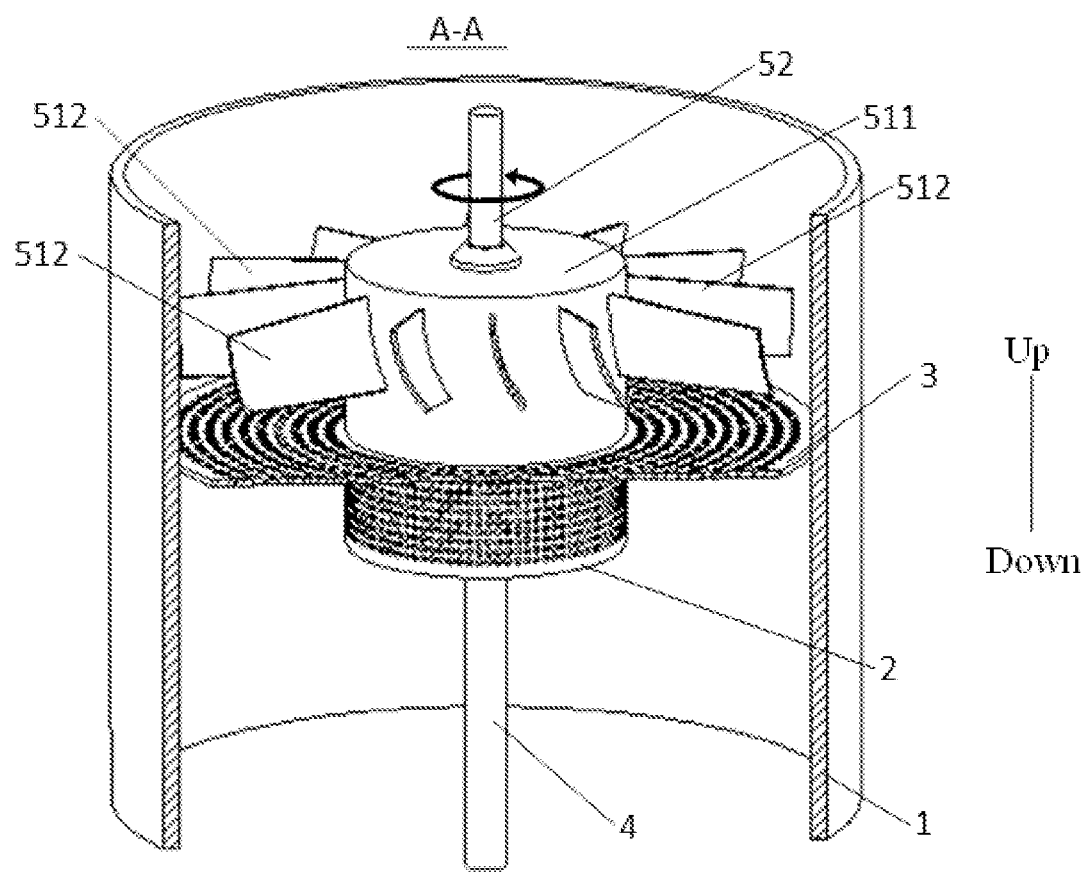
FIG. 2 is a sectional view of FIG. 1 along A-A.

In some embodiments of the disclosure, as shown in FIG. 1 to FIG. 3, the motor 52 may be arranged above the fan 51 and connected with the fan 51 to drive the purifying assembly and the fan 51 to rotate synchronously. Thus, the first rotary cylinder 2, the first rotary disk 3 and the fan 51 may be driven by the same motor 52 to rotate synchronously, so that the structure of the purification device 100 is simplified and the purification device 100 is better in consistency and higher in stability. Meanwhile, the air is purified by the purifying assembly and flows upward, and the motor 52 is arranged above the fan 51, so that the dust particles in the air can also be avoided from being accumulated on the motor 52.

In some examples of the disclosure, the fan 51 may be arranged above the first rotary disk 3, and is fixedly connected with the first rotary disk 3. That is, the motor 52 is arranged above the fan 51 and is connected with the fan 51, so the motor 52 drives the fan 51 into rotation. The fan 51 is fixedly connected with the first rotary disk 3, so that the fan 51 may drive the first rotary disk 3 into rotation and drive the first rotary cylinder 2 into rotation, thereby realizing synchronous rotation of the fan 51 and the purifying assembly. The structure is simple, and the assembling is convenient.

In some other examples of the disclosure, the motor 52 has a motor shaft, and each of the purifying assembly and the fan 51 is connected with the motor shaft. That is, each of the purifying assembly and the fan 51 may be directly connected with the motor shaft of the motor 52. In this way, the motor 52 may drive each of the purifying assembly and the fan 51 into rotation, thus ensuring the rotating speeds of the purifying assembly and the fan 51.

In some embodiments of the disclosure, the fan 51 may include a body 511 and a plurality of fan blades 512. The plurality of fan blades 512 are distributed along a circumferential direction of the body 511 and spaced apart from each other. The motor 52 may be connected with the body 511. The body 511 rotates to drive the plurality of fan blades 512 into rotation. By means of the arrangement of the plurality of fan blades 512, the flow rate of the air in the housing 1 may also be increased, thus improving the flowing property of the air in the purification device 100.

In some embodiments of the disclosure, the fan blades 512 may be arranged on a side wall of the body 511, and are located above a portion of the first rotary disk 3 which is located between the housing 1 and the body 511. Thus, the fan blades 512 rotate to drive the air to flow in the first interval space 23 between the housing 1 and the first rotary disk 3. The fan blades 512 are located above the first interval space 23, which is more favorable for driving the air to flow in the cavity 10, to ensure the flow rate of the air in the cavity 10.

As shown in FIG. 1 to FIG. 3, the body 511 may be cylindrical. The body 511 is coaxial with the first rotary disk 3 and the first rotary cylinder 2. A dimension of the body 511 in the radial direction is the same as a dimension of the first rotary cylinder 2 in the radial direction. Thus, the fan blades 512 are formed on the side wall of the body 511 and are located above the first interval space 23. This is thus more favorable for promoting the flow of the air and can avoid resistance in the flow of the air due to inconsistency in dimension between the body 511 and the first rotary cylinder 2. This is also favorable for improving the consistency and stability of assembling of the body 511, the first rotary disk 3 and the first rotary cylinder 2. The fan 51 may be supported on the first rotary disk 3. The dimension of the body 511 is consistent with the dimension of the first rotary cylinder 2, which is also favorable for improving the supporting effect and stability of the purifying assembly on the fan 51.

Figure 4:
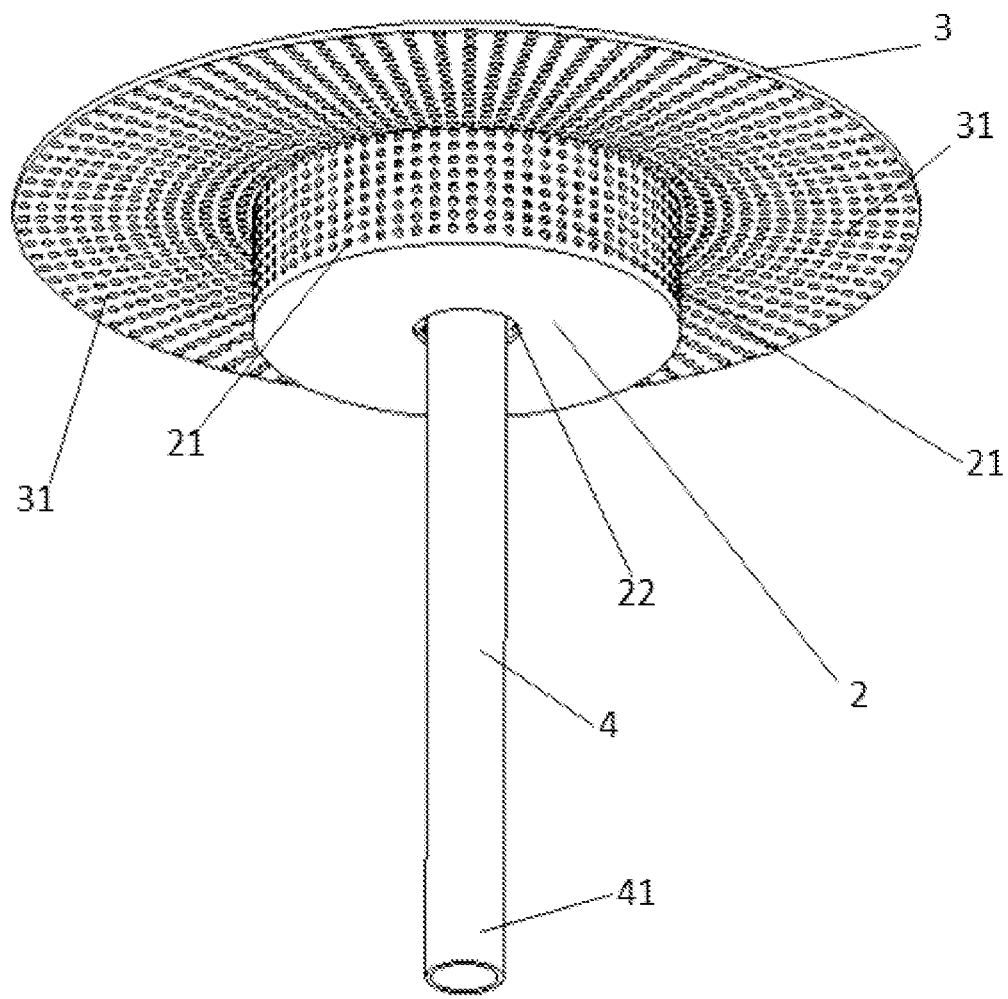
FIG. 4 illustrates a schematic diagram of a purifying assembly and a water inlet pipe of a purification device for purifying air according to an embodiment of the disclosure.
Figure 5:
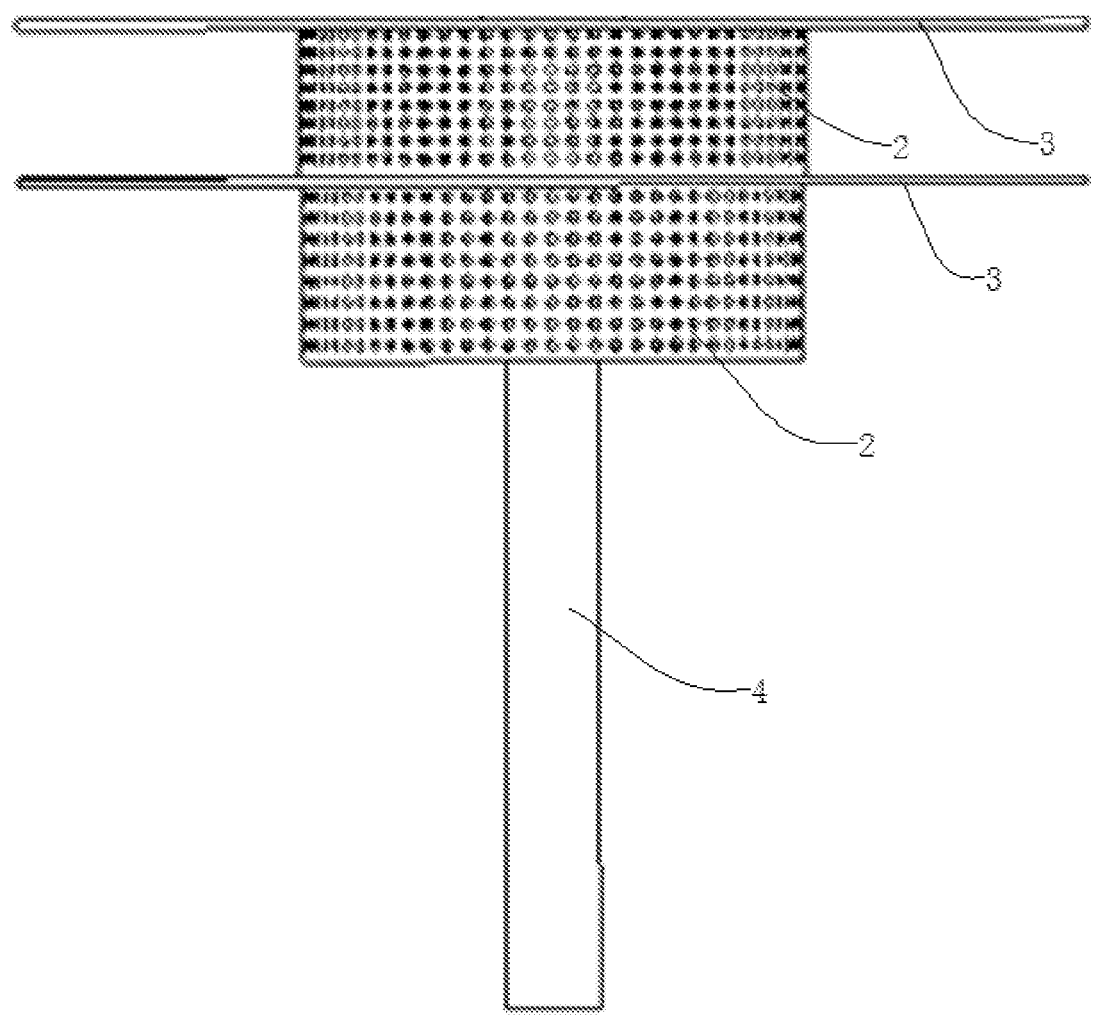
FIG. 5 illustrates a schematic diagram of a purifying assembly and a water inlet pipe of a purification device for purifying air according to another embodiment of the disclosure.

In some embodiments of the disclosure, each of an upper and a lower end of the first rotary cylinder 2 is formed as a closed structure. That is, each of a top and a bottom of the first rotary cylinder 2 is closed, thus preventing the water from leaking out of the first rotary cylinder 2 and corroding other components, and also preventing the air from leaving from the top of the first rotary cylinder 2 without passing through the first rotary disk 3. As shown in FIG. 4, the bottom wall of the first rotary cylinder 2 is provided with an opening 22 adapted to be passed by the water inlet pipe 4. The water discharge end 42 of the water inlet pipe 4 extends into the first rotary cylinder 2 through the opening 22. A dimension of the opening 22 may be slightly larger than a dimension of the water inlet pipe 4, which is favorable for the rotation of the first rotary cylinder 2 relative to the water inlet pipe 4 and is also favorable for the assembling of the water inlet pipe 4 and the opening 22.

In some embodiments of the disclosure, the air outlet 12 is arranged at a position higher than the air inlet 11. The purification device for purifying air includes a plurality of purifying assemblies which are sequentially stacked in an up and down direction. That is, the plurality of purifying assemblies can be coaxially arranged, and are located between the air outlet 12 and the air inlet 11. Specifically, there may be a plurality of first rotary cylinders 2 and a plurality of first rotary disks 3. The plurality of first rotary cylinders 2 and the plurality of first rotary disks 3 may be alternately arranged in sequence. Therefore, the air can pass through the plurality of purifying assemblies in sequence to realize multi-stage purification for the air, to enhance the purification effect. It should be noted that "plurality" here means two or more. For example, there may be two, three, four or five purifying assemblies. The plurality of purifying assemblies are coaxially arranged in the up and down direction. The motor 52 can simultaneously drive the plurality of purifying assemblies into rotation, thereby further ensuring the consistency and the stability of the purification device 100.

In some embodiments of the disclosure, the purifying assembly for air purification further includes a capture member. The capture member is rotatably arranged between the purifying assembly and the fan assembly 5. Thus, the water drops and the dust particles, which are contained in the air purified by the purifying assembly, may be captured by means of the capture member. Therefore, further purification for the air can be realized, and the motor 52 can be avoided from being corroded by the water contained in the air purified by the purifying assembly and being covered by the dust particles. In an example, the motor 52 may drive the purifying assembly, the capture member and the fan 51 to rotate synchronously.

Specifically, the capture member includes a second rotary cylinder and a second rotary disk. An outer circumferential wall of the second rotary cylinder is a cylindrical surface. That is, the outer circumferential wall of the second rotary cylinder is in the form of a closed wall surface, and the interior of the second rotary cylinder does not communicate with the exterior of the second rotary cylinder. For example, the second rotary cylinder can be in the form of an airtight and waterproof structure. The second rotary cylinder is spaced apart from the side wall of the housing 1, so that the air may pass through a second interval space between the second rotary cylinder and the housing 1.

Specifically, the second rotary cylinder is located downstream of the first rotary disk 3, and the second interval space is formed between the second rotary cylinder and the housing 1. The second interval space can be adapted to be passed by the air. Thus, the air purified by means of the first rotary disk 3 can flow through the second interval space. By means of the second rotary cylinder rotating at the high speed, the centrifugal motion of the air that flows through the second interval space may be enhanced, so that this is favorable for throwing the water drops carried in the air to the inner wall surface of the housing 1, and then is favorable for separating air from liquid and enhancing the purification effect.

A portion of the second rotary disk, which is located between the second rotary cylinder and the housing 1 at least in the radial direction, is provided with a third mesh. That is, at least a portion of the second rotary disk, which corresponds to the second interval space in an axial direction of the second rotary disk, is provided with a plurality of third meshes. By means of the third meshes, further capture for the water drops in the air and further purification for the air may be realized.

The second rotary disk is connected downstream of the second rotary cylinder. The air purified by means of the first rotary disk 3 flows to the second rotary disk. When tiny water drops in the air contacts the second rotary disk, the water drops may be spread, on the second rotary disk provided with the plurality of third meshes, into a thin liquid film or atomized into smaller water drops. The thin liquid film or the smaller atomized water drops collide strongly with the air passing through the third meshes, so that the air-liquid contact area can be further enlarged. At the same time, the spread thin liquid film or the small water drops also have a more efficient capturing effect on the dust particles contained in the air, so dust removal can be further improved. Meanwhile, the second rotary disk may also drive the air to continue to flow to improve the flowing property.

In some embodiments of the disclosure, the capture member may be arranged above the purifying assembly, and the fan 51 may be arranged above the capture member. There may be a plurality of capturing assemblies and a plurality of purifying assemblies. The plurality of purifying assemblies and the plurality of capturing assemblies are sequentially stacked in the up and down direction. At least one capture member is arranged at a position closest to the fan 51, thus multi-stage purification for the air and multiple capture for the water drops in the air can be realized to enhance the air purification effect and reduce the moisture content of the air. Furthermore, it can be ensured that the air continues to flow upwards until the air passes through the last capture member, to ensure that the cleanest air with the smallest moisture content flows upwards, thus further ensuring that the motor 51 is not corroded and is not covered by the dust particles.

The disclosure further provides an air purifier provided with the purification device 100 for air purification according to the above embodiments.

By means of the arrangement of the purification device 100 for air purification according to the above embodiments, the air purifier according to the embodiments of the disclosure can enhance the purification effect, so that air purified by the air purifier is cleaner, and pressure loss may be avoided. At the same time, the purifying assembly and the fan 51 are driven by the same motor 52, so that the air purifier is simple in structure and low in energy consumption.

Other constitutions and operations of the air purifier according to the embodiments of the disclosure are known to those of ordinary skill in the art, and no more details will be described here.

In the description of this specification, a description of the reference terms such as "one embodiment" "some embodiments" "illustrative embodiments" "examples" "specific examples" or "some examples" means that specific features, structures, materials or characteristics described in connection with the embodiments or examples are included in at least one embodiment or example of the disclosure. In this specification, schematic representations of the above terms do not necessarily refer to the same embodiment or example. Moreover, the specific features, structures, materials or characteristics described may be combined in an appropriate manner in any one or more embodiments or examples.

Although the embodiments of the disclosure have been shown and described, those of ordinary skill in the art can understand that a variety of changes, modifications, substitutions and variants can be made to these embodiments without departing from the principle and purpose of the disclosure, and the scope of the disclosure is limited by the claims and their equivalents.

What is claimed is:

1. A purification device for purifying air, comprising:
a housing provided with an air inlet and an air outlet, wherein a cavity communicating with the air inlet and the air outlet is defined in the housing;
at least one purifying assembly rotatably arranged in the cavity and located between the air inlet and the air outlet, wherein a respective purifying assembly of the at least one purifying assembly comprises a first rotary cylinder and a first rotary disk, the first rotary cylinder is spaced apart from a side wall of the housing, a side wall of the first rotary cylinder is provided with a first mesh in a circumferential direction of the side wall of the first rotary cylinder, the first rotary disk is connected downstream of the first rotary cylinder, and a portion of the first rotary disk, which is located between the first rotary cylinder and the housing in a radial direction, is provided with a second mesh;
a water inlet pipe comprising a water inflow end and a water discharge end, the water discharge end being provided with a plurality of circumferentially distributed water injection nozzles, and the water discharge end extending into the first rotary cylinder; and
a fan assembly comprising a fan and a motor, the fan being arranged downstream of the purifying assembly to drive air to flow from the air inlet to the air outlet via the purifying assembly, and the motor being configured to drive the purifying assembly and the fan into rotation.

2. The purification device for purifying air according to claim 1, wherein the motor is arranged above the fan and is connected with the fan to drive the at least one purifying assembly and the fan to rotate synchronously.

3. The purification device for purifying air according to claim 2, wherein the fan is arranged above the first rotary disk and is fixedly connected with the first rotary disk.

4. The purification device for purifying air according to claim 2, wherein the motor has a motor shaft, and each of the at least one purifying assembly and the fan is connected with the motor shaft.

5. The purification device for purifying air according to claim 1, wherein the fan comprises a body and a plurality of fan blades, and the plurality of fan blades are distributed along a circumferential direction of the body and spaced apart from each other.

6. The purification device for purifying air according to claim 5, wherein the fan blades are arranged on a side wall of the body, and are located above a portion of the first rotary disk which is located between the housing and the body.

7. The purification device for purifying air according to claim 5, wherein the body is cylindrical, the body is coaxial with the first rotary disk and the first rotary cylinder, and a dimension of the body in the radial direction is the same as a dimension of the first rotary cylinder in the radial direction.

8. The purification device for purifying air according to claim 1, wherein each of an upper end and a lower end of the first rotary cylinder is formed as a closed structure, and a bottom wall of the first rotary cylinder is provided with an opening adapted to be passed by the water inlet pipe.

9. The purification device for purifying air according to claim 1, wherein the air outlet is arranged at a position higher than the air inlet, and the at least one purifying assembly is sequentially stacked in an up and down direction.

10. The purification device for purifying air according to claim 1, further comprising a capture member, wherein the capture member is rotatably arranged between the at least one purifying assembly and the fan assembly and comprises a second rotary cylinder and a second rotary disk, an outer circumferential wall of the second rotary cylinder is a cylindrical surface, the second rotary cylinder is spaced apart from the side wall of the housing, the second rotary disk is connected downstream of the second rotary cylinder, and a portion of the second rotary disk, which is located between the second rotary cylinder and the housing at least in the radial direction, is provided with a third mesh.

11. An air purifier comprising a purification device for purifying air, wherein the purification device for purifying air comprises:
a housing provided with an air inlet and an air outlet, wherein a cavity communicating with the air inlet and the air outlet is defined in the housing;
at least one purifying assembly rotatably arranged in the cavity and located between the air inlet and the air outlet, wherein a respective purifying assembly of the at least one purifying assembly comprises a first rotary cylinder and a first rotary disk, the first rotary cylinder is spaced apart from a side wall of the housing, a side wall of the first rotary cylinder is provided with a first mesh in a circumferential direction of the side wall of the first rotary cylinder, the first rotary disk is connected downstream of the first rotary cylinder, and a portion of the first rotary disk, which is located between the first rotary cylinder and the housing in a radial direction, is provided with a second mesh;
a water inlet pipe comprising a water inflow end and a water discharge end, the water discharge end being provided with a plurality of circumferentially distributed water injection nozzles, and the water discharge end extending into the first rotary cylinder; and
a fan assembly comprising a fan and a motor, the fan being arranged downstream of the purifying assembly to drive air to flow from the air inlet to the air outlet via the purifying assembly, and the motor being configured to drive the purifying assembly and the fan into rotation.

12. The air purifier according to claim 11, wherein the motor is arranged above the fan and is connected with the fan to drive the at least one purifying assembly and the fan to rotate synchronously.

13. The air purifier according to claim 12, wherein the fan is arranged above the first rotary disk and is fixedly connected with the first rotary disk.

14. The air purifier according to claim 12, wherein the motor has a motor shaft, and each of the at least one purifying assembly and the fan is connected with the motor shaft.

15. The air purifier according to claim 11, wherein the fan comprises a body and a plurality of fan blades, and the plurality of fan blades are distributed along a circumferential direction of the body and spaced apart from each other.

16. The air purifier according to claim 15, wherein the fan blades are arranged on a side wall of the body, and are located above a portion of the first rotary disk which is located between the housing and the body.

17. The air purifier according to claim 15, wherein the body is cylindrical, the body is coaxial with the first rotary disk and the first rotary cylinder, and a dimension of the body in the radial direction is the same as a dimension of the first rotary cylinder in the radial direction.

18. The air purifier according to claim 11, wherein each of an upper end and a lower end of the first rotary cylinder is formed as a closed structure, and a bottom wall of the first rotary cylinder is provided with an opening adapted to be passed by the water inlet pipe.

19. The air purifier according to claim 11, wherein the air outlet is arranged at a position higher than the air inlet, and the at least one purifying assembly is sequentially stacked in an up and down direction.

20. The air purifier according to claim 11, wherein the purification device for purifying air further comprises a capture member, wherein the capture member is rotatably arranged between the at least one purifying assembly and the fan assembly and comprises a second rotary cylinder and a second rotary disk, an outer circumferential wall of the second rotary cylinder is a cylindrical surface, the second rotary cylinder is spaced apart from the side wall of the housing, the second rotary disk is connected downstream of the second rotary cylinder, and a portion of the second rotary disk, which is located between the second rotary cylinder and the housing at least in the radial direction, is provided with a third mesh.

* * * * *